United States Patent
Nishikawa

(10) Patent No.: US 6,411,439 B2
(45) Date of Patent: *Jun. 25, 2002

(54) MICROLENS ARRAY, A MANUFACTURING METHOD THEREFOR, AND A DISPLAY APPARATUS USING THE SAME

(75) Inventor: Takao Nishikawa, Shiojiri (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,280

(22) Filed: May 18, 1999

(30) Foreign Application Priority Data

May 19, 1998  (JP) ............................................ 10-153796

(51) Int. Cl.⁷ ......................... G02B 27/10; G02B 21/60
(52) U.S. Cl. ...................................... 359/619; 359/455
(58) Field of Search ................................. 359/619, 620, 359/621, 622, 455, 742, 743, 456, 541, 542, 623, 624; 264/1.1, 1.7, 2.5

(56) References Cited

U.S. PATENT DOCUMENTS

| | | | |
|---|---|---|---|
| 4,877,717 A | * 10/1989 | Suzuki et al. | 430/321 |
| 5,074,649 A | * 12/1991 | Hamanaka | 359/652 |
| 5,225,935 A | * 7/1993 | Watanabe et al. | 359/619 |
| 5,298,366 A | * 3/1994 | Iwasaki et al. | 430/321 |
| 5,543,942 A | * 8/1996 | Mizuguchi et al. | 359/40 |
| 5,630,902 A | * 5/1997 | Galar Neau et al. | 156/379.8 |
| 5,657,125 A | * 8/1997 | Kato et al. | 356/356 |
| 5,757,449 A | * 5/1998 | Nishixaki et al. | 349/104 |
| 5,871,563 A | * 2/1999 | Ling | 216/2 |
| 6,129,866 A | * 10/2000 | Hamanaka et al. | 264/1.7 |
| 6,211,916 B1 | * 4/2001 | Hawkins et al. | 348/430 |
| 6,297,911 B1 | * 10/2001 | Nishikawa et al. | 359/619 |

FOREIGN PATENT DOCUMENTS

| | | | |
|---|---|---|---|
| JP | 3-198003 | 8/1991 | |
| JP | 405303009 | * 11/1993 | G02B/3/10 |

* cited by examiner

Primary Examiner—Georgia Epps
Assistant Examiner—Saeed Seyrafi
(74) Attorney, Agent, or Firm—Michael T. Gabrik

(57) ABSTRACT

A microlens array manufacturing method has a first step for forming a master having a plurality of curved surfaces; a second step for forming a duplicate master having a plurality of curved surfaces transferred from the curved surfaces on the master; and a third step for forming a light transmitting layer having a plurality of lenses transferred from the curved surfaces on the duplicate master. The frequency of producing high cost masters is thus reduced, enabling microlens arrays to be manufactured at low cost.

18 Claims, 9 Drawing Sheets

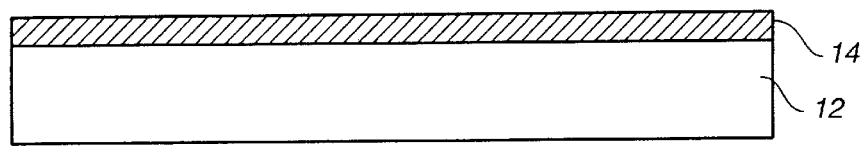
FIG._1A
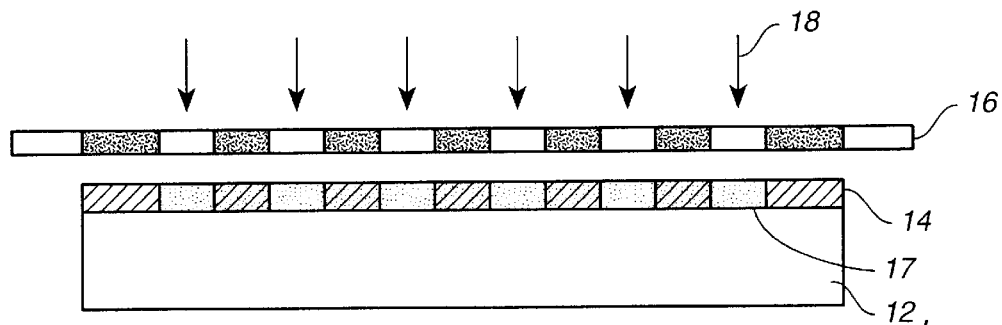
FIG._1B
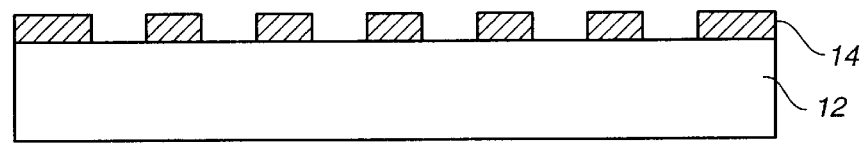
FIG._1C
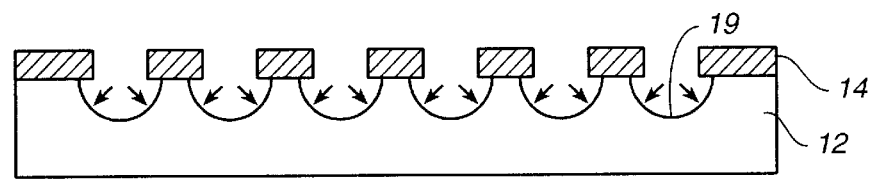
FIG._1D
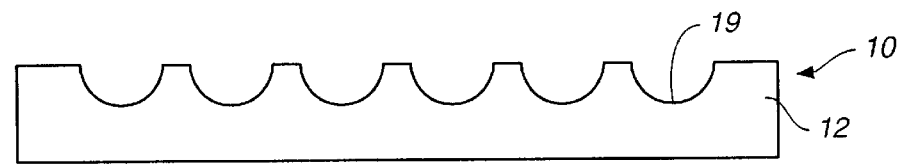
FIG._1E

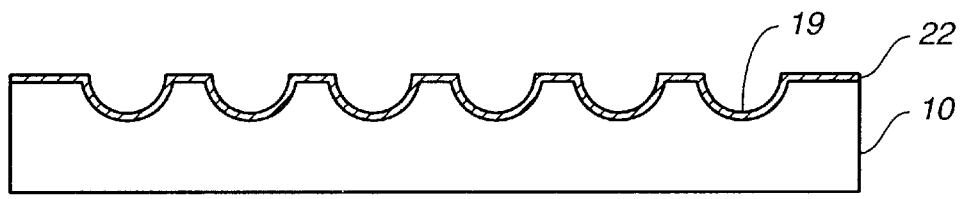
FIG._2A
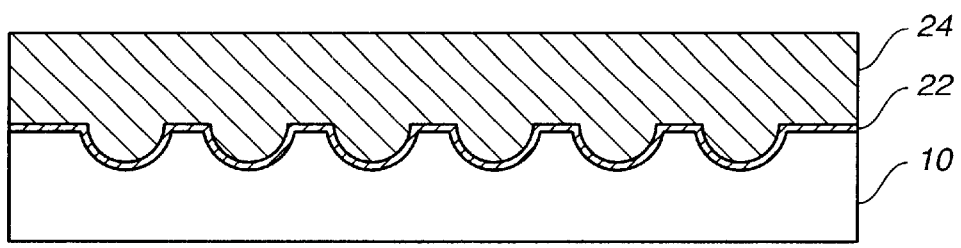
FIG._2B
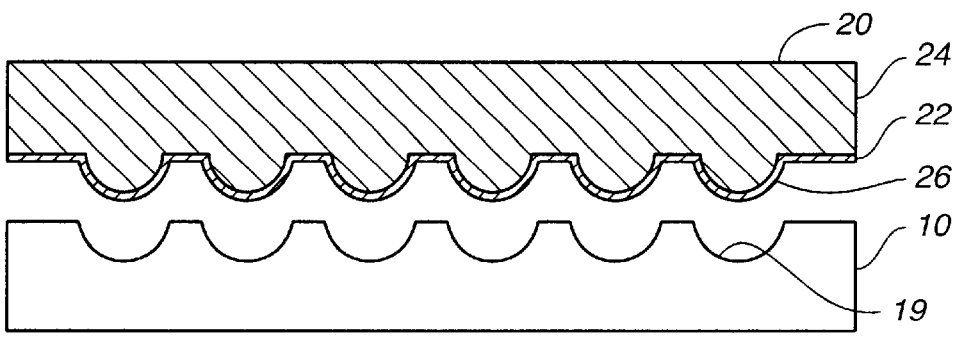
FIG._2C

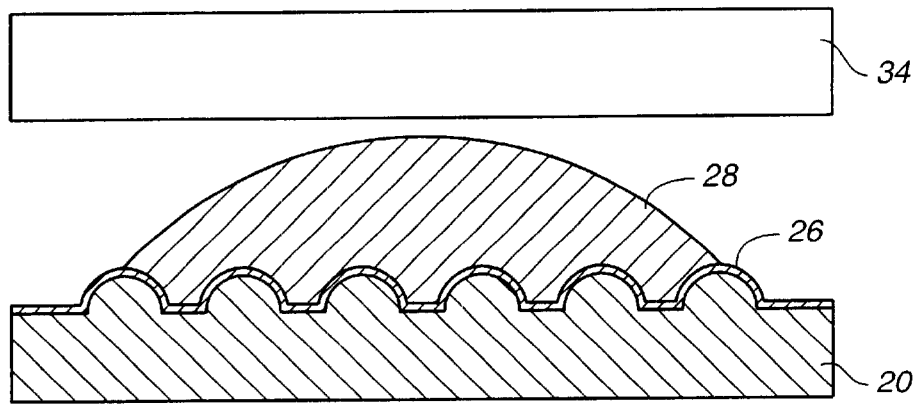
FIG._3A
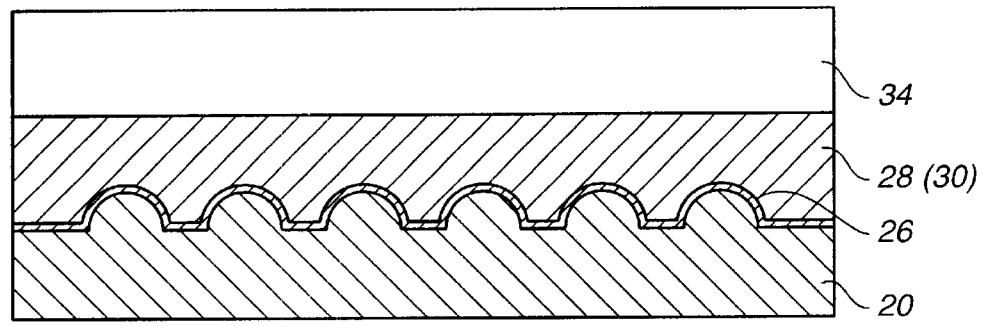
FIG._3B
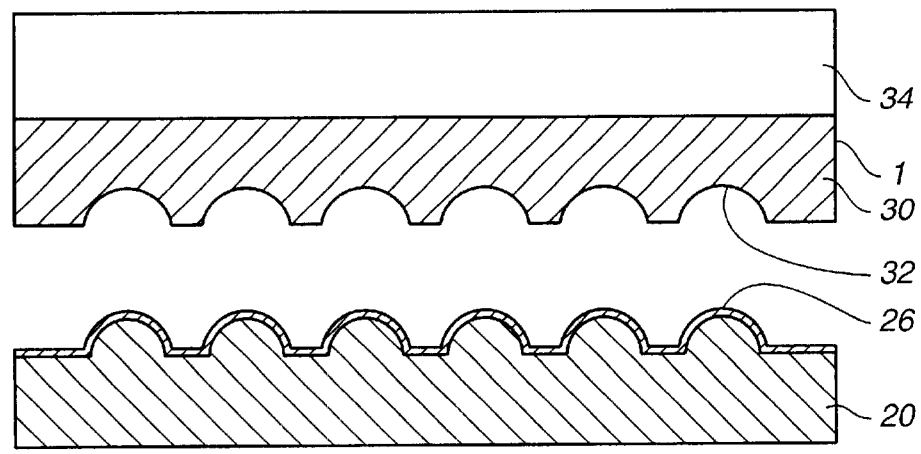
FIG._3C

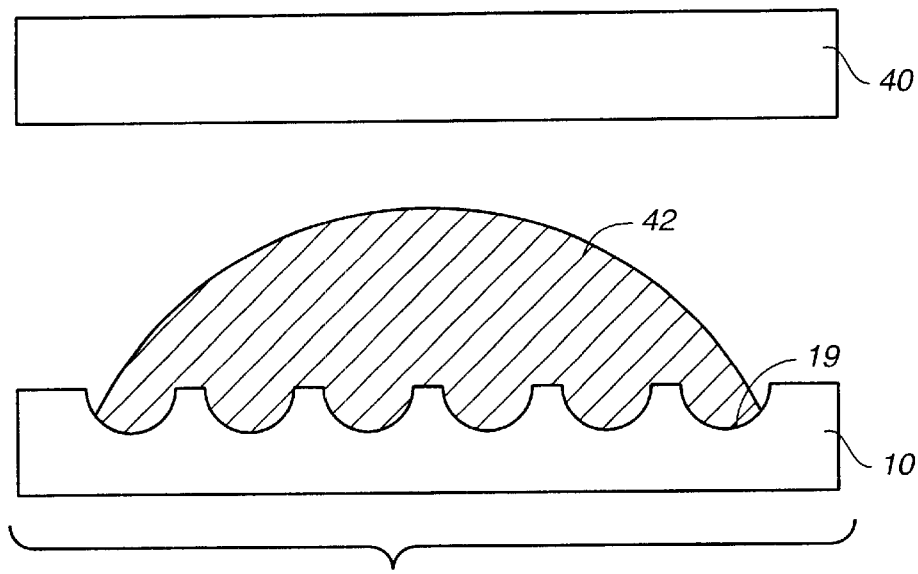
FIG._4A
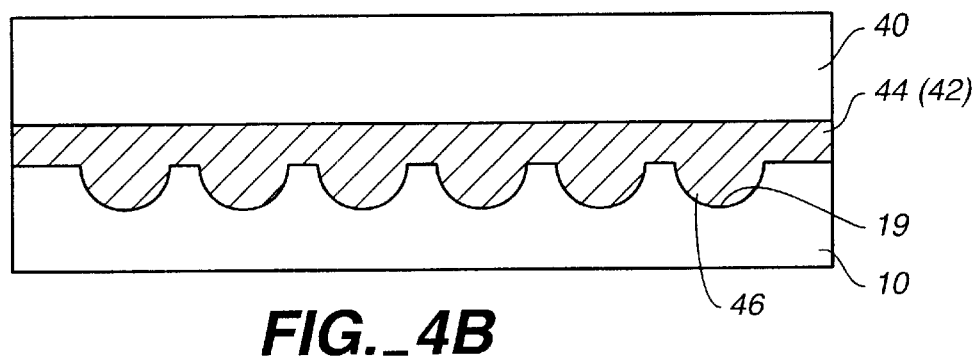
FIG._4B
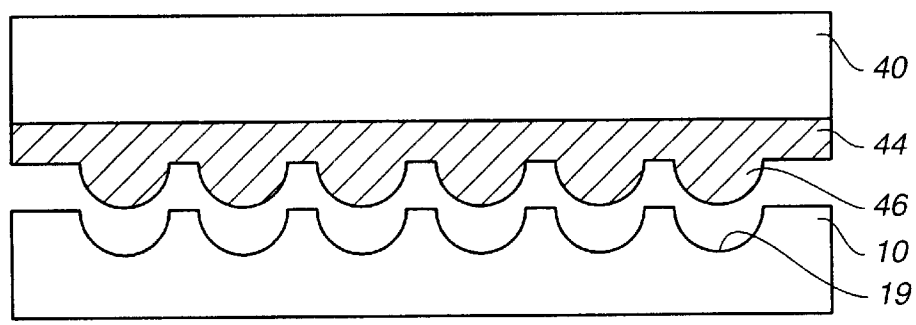
FIG._4C

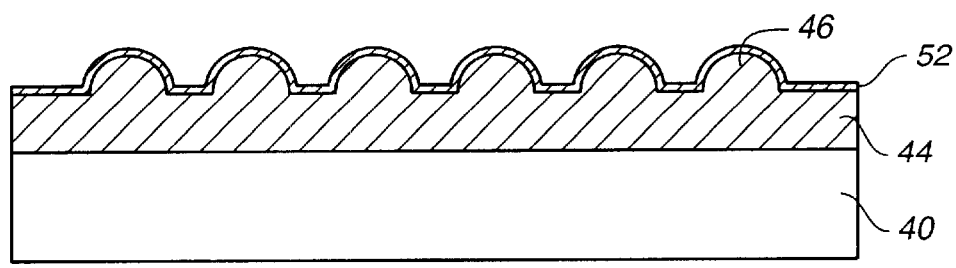
FIG._5A
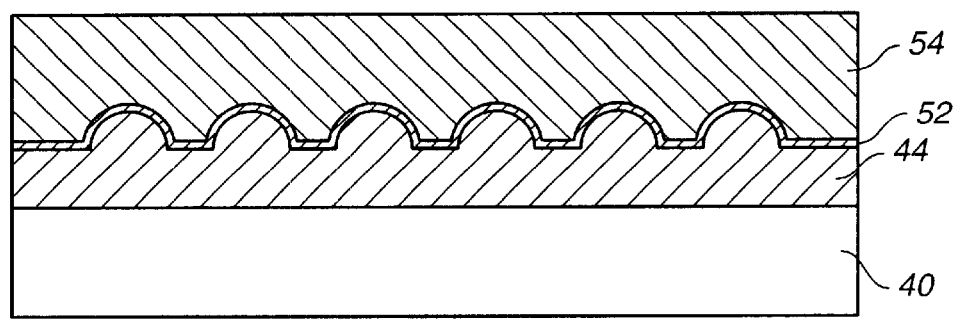
FIG._5B
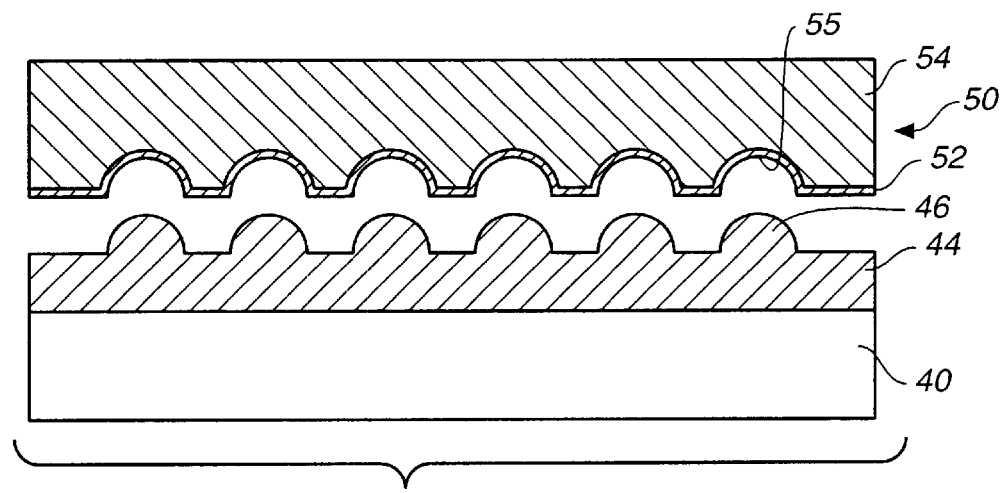
FIG._5C

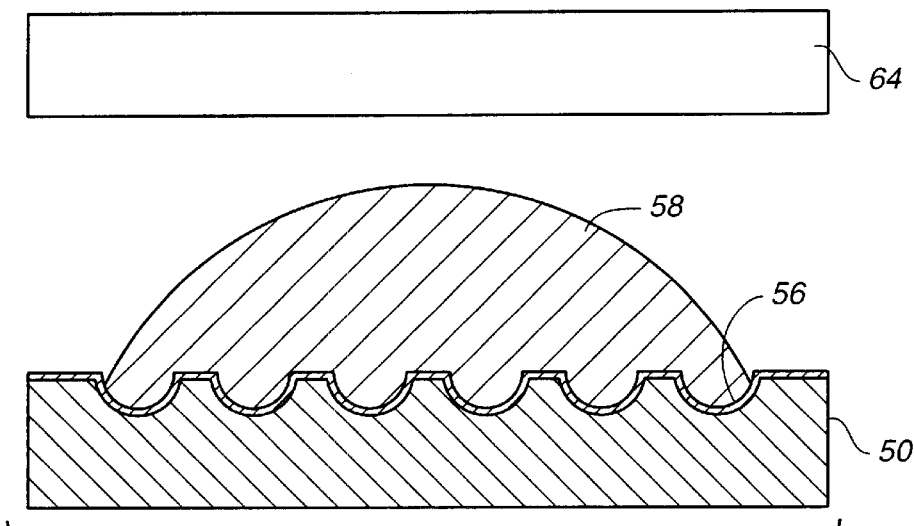
FIG._6A
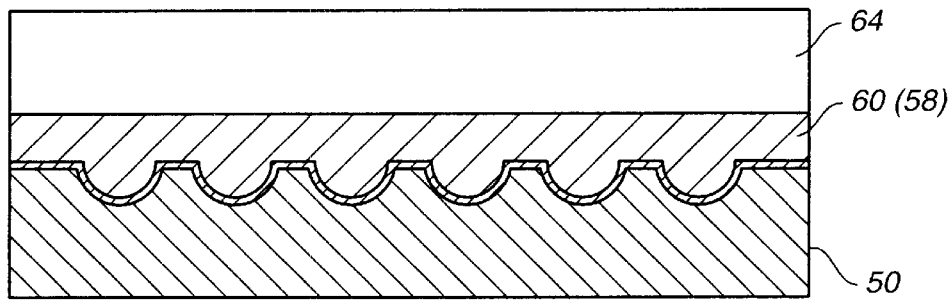
FIG._6B
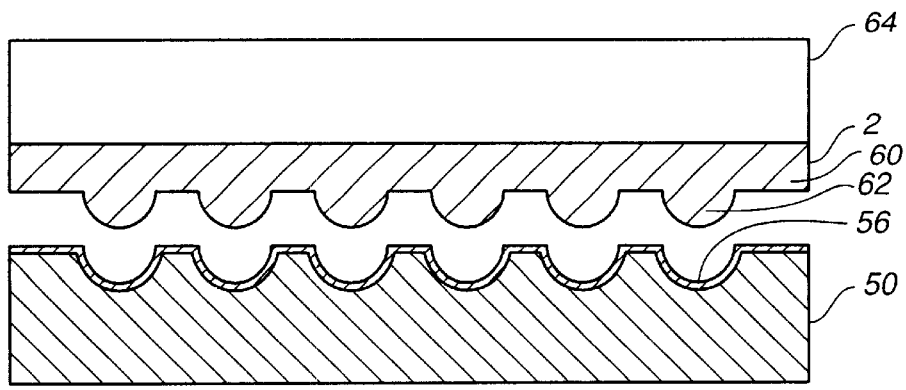
FIG._6C

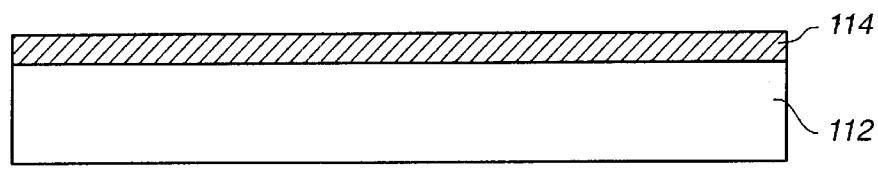
FIG._7A
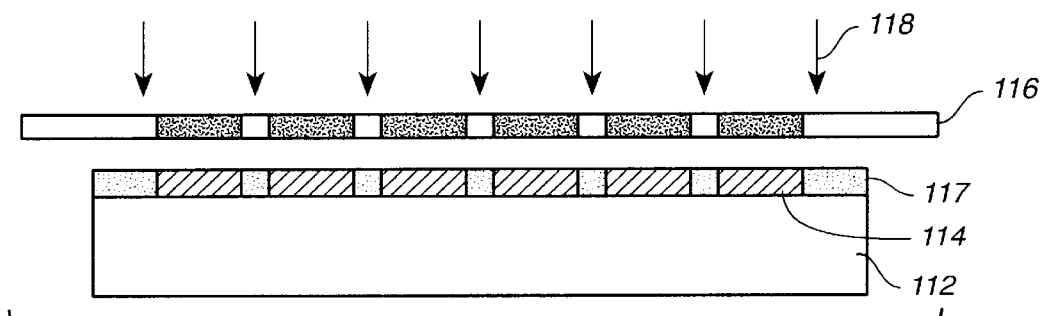
FIG._7B
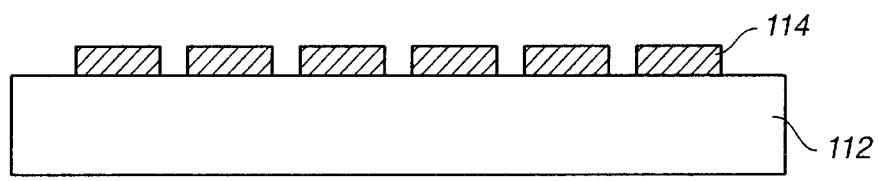
FIG._7C
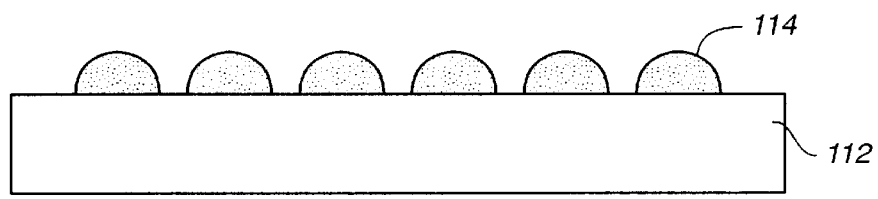
FIG._7D
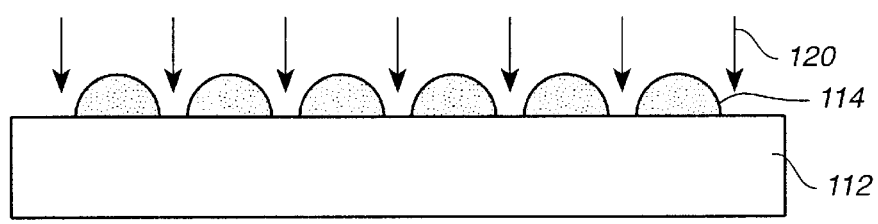
FIG._7E

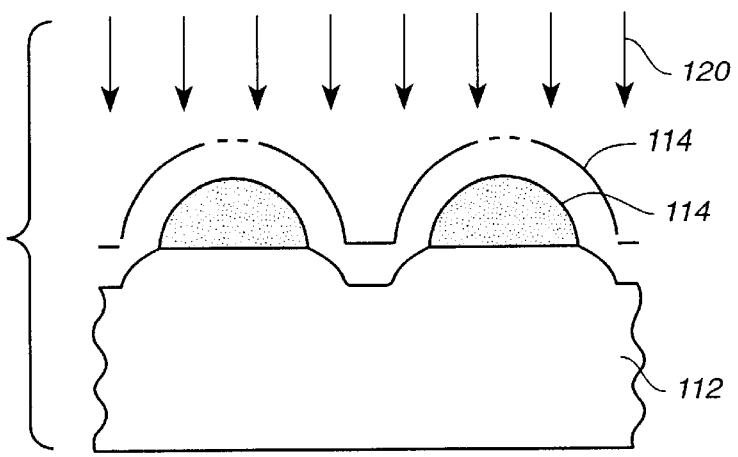
*FIG._8A*
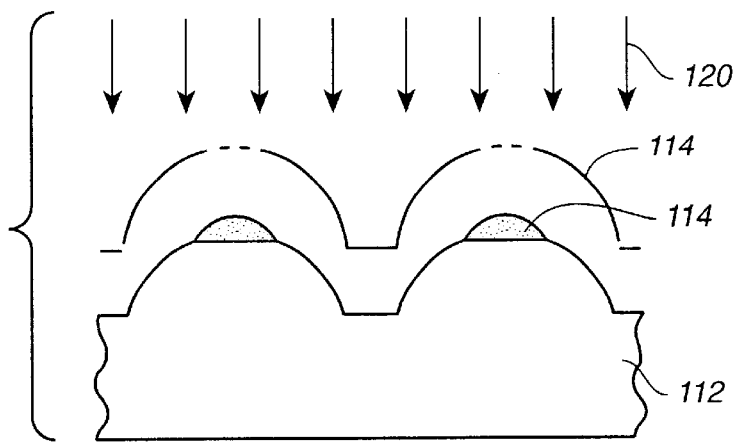
*FIG._8B*
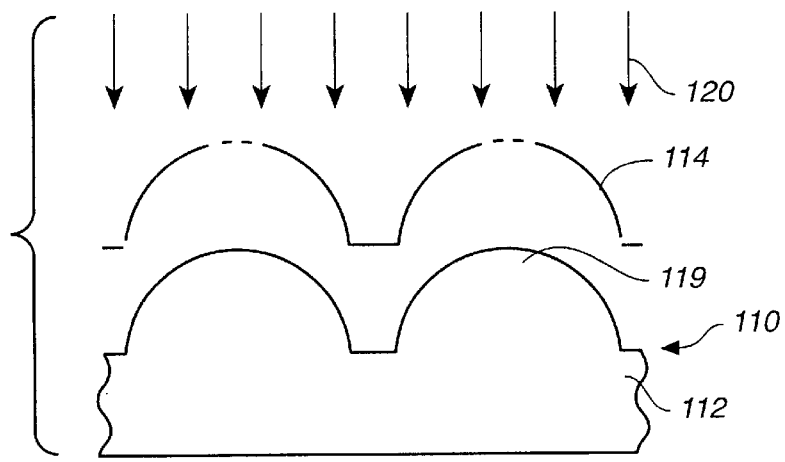
*FIG._8C*

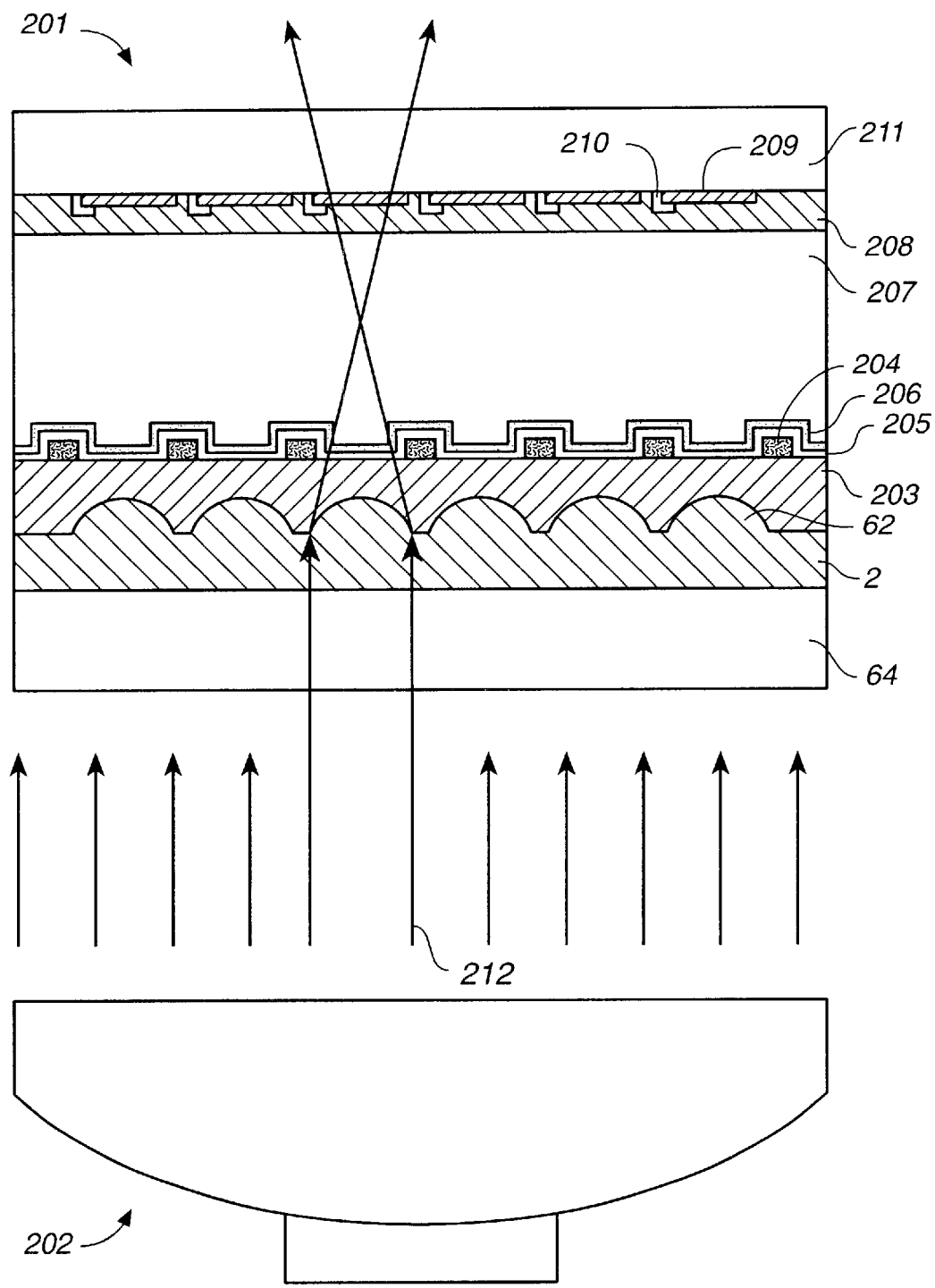
FIG._9

MICROLENS ARRAY, A MANUFACTURING METHOD THEREFOR, AND A DISPLAY APPARATUS USING THE SAME

BACKGROUND OF THE INVENTION

1. Field of the Invention

The present invention relates to a microlens array, to a manufacturing method for this microlens array, and to a display device using the same microlens array.

2. Description of the Related Art

Microlens arrays comprising a large number of very small lenses arranged in an ordered array have been used in liquid crystal display (LCD) panels and other applications. Using a microlens array in an LCD panel makes it possible for each lens to focus incident light on an individual pixel, and thereby achieve a bright display.

Microlens arrays can be manufactured using both dry etching and wet etching methods. A drawback to both dry and wet etching methods is the need for a lithography step in the production of each microlens array, thus increasing manufacturing cost.

To resolve this problem, Japan Unexamined Patent Application Publication (kokai) 3-198003 teaches a method for manufacturing a microlens array without using a lithography step. This method uses a master having formed thereon curved surfaces corresponding to each of the lenses in the microlens array. A resin is then deposited on this master, set, and removed from the master.

This method in effect uses the master as a mold to form the microlens array in a transfer molding process, and thus eliminates the lithography process required by conventional wet and dry etching methods for each microlens array. Once the master is prepared it can be reused repeatedly insofar as the durability of the master permits. The per-product cost of the master therefore decreases as the durability of the master increases, and this contributes to lower product (microlens array) cost.

A drawback to this method is that the master is used in the production of each product, leading to contamination and wear of the master, and therefore faster deterioration of the master. This deterioration is apparent as deformation of the pattern shape. Lithography is also used to manufacture the master. The cost of master manufacture is therefore high, and an increase in the frequency of master manufacture is thus a factor in higher unit cost for each product.

SUMMARY OF THE INVENTION

To resolve the aforementioned problems, an object of the present invention is to provide a method for manufacturing a microlens array at low cost by reducing the frequency with which high cost microlens array masters must be manufactured.

A further object of the present invention is to provide a microlens array manufactured with the manufacturing method of the invention.

A first microlens array manufacturing method according to the present invention comprises: a first step for forming a master having a plurality of first curved surfaces; a second step for forming a duplicate master having a plurality of second curved surfaces transferred from the first curved surfaces; and a third step for forming a light transmitting layer having a plurality of lenses transferred from the second curved surfaces.

A manufacturing method according to the present invention thus produces a duplicate master of a master having a plurality of curved surfaces, and uses this duplicate master to produce the individual microlens arrays having a plurality of lenses.

With this method a high cost master is therefore used only when producing a duplicate master, thus reducing deterioration of the master and the frequency with which the master must be manufactured again. Microlens array production cost is therefore reduced.

The duplicate master produced with this first microlens array manufacturing method according to the present invention can be manufactured by forming a metal layer using an electroforming process on the first curved surfaces side of the master, and then separating this metal layer from the master. A duplicate master can be easily produced by thus using an electroforming, particularly an electroplating, process.

A second microlens array manufacturing method according to the present invention comprises a first step for forming a master having a plurality of first curved surfaces; a second step for forming an intermediate master having a plurality of second curved surfaces transferred from the first curved surfaces; a third step for forming a duplicate master having a plurality of third curved surfaces transferred from the second curved surfaces; and a fourth step for forming a light transmitting layer having a plurality of lenses transferred from the third curved surfaces.

This second manufacturing method of the present invention produces a duplicate master using an intermediate master manufactured from the original master. There is thus greater freedom in the methods that can be used to manufacture the duplicate master, and in the materials that can be used for the master and the duplicate master. The shape of the curved surfaces can also be transferred with high precision, and the durability of the master and duplicate master can be further improved.

In this second manufacturing method according to the present invention, the second step for forming an intermediate master preferably comprises: a step for coating an intermediate master precursor on the first curved surfaces side of the master; a step for setting the intermediate master precursor to form an intermediate master; and a step for separating the intermediate master from the master. The intermediate master precursor in this method preferably contains a material that can be set by applying energy, for example light or heat, to the precursor material. A thermoplastic precursor can also be used.

Further preferably, the intermediate master is made from a resin material.

In this microlens array manufacturing method the duplicate master is preferably obtained by forming a metal layer by an electroforming process on the second curved surfaces side of the intermediate master, and then separating this metal layer from the intermediate master.

In both of the above first and second manufacturing methods, the step for forming a light transmitting layer preferably comprises: a step for coating a light transmitting layer precursor on the curved surfaces side of the duplicate master; a step for setting the light transmitting layer precursor to form a light transmitting layer; and a step for separating the light transmitting layer from the duplicate master.

The light transmitting layer precursor further preferably contains a material that can be set by applying energy, preferably light or heat, thereto. The light transmitting layer precursor can also be a thermoplastic material. The light transmitting layer is also preferably made from a resin material.

The first curved surfaces of the master are preferably formed by lithographic and etching processes because of the high precision of these processes. Etching methods are particularly desirable when forming the first curved surfaces because the first curved surfaces are the basis of the final lenses.

The master is further preferably made of silicon or quartz. Silicon and quartz provide excellent surface smoothness, and can be easily processed using lithographic and etching methods.

High performance microlens arrays can therefore be manufactured using the first or second manufacturing method of the present invention.

The present invention further provides a display device comprising a microlens array manufactured using a method according to the present invention, and a light source for emitting light towards the microlens array.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 1(A) to (E) are section views illustrating steps in the manufacture of a master according to a first embodiment of the present invention;

FIGS. 2(A) to (C) are section views illustrating steps in the manufacture of a copy of a master in a first embodiment of the present invention;

FIGS. 3(A) to (C) are section views illustrating steps in the manufacture of a microlens array according to a first embodiment of the present invention;

FIGS. 4(A) to (C) are section views illustrating steps in the manufacture of an intermediate master according to a second embodiment of the present invention;

FIGS. 5(A) to (C) are section views illustrating steps in the manufacture of a copy of an intermediate master according to a second embodiment of the present invention;

FIGS. 6(A) to (C) are section views illustrating steps in the manufacture of a microlens array according to a second embodiment of the present invention;

FIGS. 7(A) to (E) are section views illustrating steps in the manufacture of a master according to a third embodiment of the present invention;

FIGS. 8(A) to (C) are section views illustrating the etching process in the master manufacturing method according to a third embodiment of the present invention; and FIG. 9 is a section view illustrating an electronic device the function thereof using a microlens array according to the present invention.

DESCRIPTION OF THE PREFERRED EMBODIMENTS

The preferred embodiments of the present invention are described below with reference to the accompanying figures.
Embodiment 1

A manufacturing method according to a first preferred embodiment of the present invention is described below with reference to FIG. 1(A) to FIG. 3(C). FIGS. 1(A) to (E) are section views illustrating steps in the manufacture of a master according to this first embodiment of the present invention.

The first step in the production of a microlens array master is to form a resist layer 14 on a substrate 12 as shown in FIG. 1(A). The surface of this substrate 12 is etched to form the final master 10 shown in FIG. 1(E). Any etchable material can therefore be used for the substrate 12, but a silicon or quartz material is preferable because of the ease with which high precision curved surfaces 19 (see FIG. 1(E)) can be formed by etching.

The material used for the resist layer 14 is, for example, a commercially available positive resist material commonly used in the manufacture of semiconductor devices. One such material is a cresol novolak resin with a diazonaphthoquinone derivative added as a photosensitizer. It is to be noted that a positive resist as used herein means a material which, when exposed to radiation through a mask so that only selective parts of the material are bombarded by the radiation, enables those bombarded parts to be selectively removed by a developing solution.

The resist layer 14 can be formed using such methods as spin coating, dipping, spray coating, roll coating, and bar coating.

The next step, as shown in FIG. 1(B), is to place a mask 16 over the resist layer 14, and expose the resist layer 14 to radiation 18 through the mask 16. The mask 16 thus assures that only selected parts of the resist layer 14 are exposed to radiation 18.

More specifically, the mask 16 is patterned to pass radiation 18 only to those areas where the curved surfaces 19 shown in FIG. 1(E) are to be formed.

The radiation 18 is preferably light with a wavelength in the 200 nm to 500 nm range. Using light in this wavelength range makes it possible to use photolithography techniques and systems already proven in LCD panel manufacturing processes, and thus helps minimize manufacturing costs.

After exposing the resist layer 14 to radiation 18, the resist layer 14 is processed under specific developing conditions to selectively remove the radiation-bombarded regions 17. This developing step exposes the substrate 12 in the radiation-bombarded areas, and leaves the substrate 12 covered by the resist layer 14 where the resist layer 14 was not exposed to radiation 18 (FIG. 1(C)).

After thus patterning the resist layer 14, the resist layer 14 is used as a mask for etching the substrate 12 to a specific depth as shown in FIG. 1(D). More specifically, the parts of the substrate 12 exposed through the resist layer 14 are etched using an isotropic etching technique whereby etching proceeds at the same rate in all directions. An isotropic wet etching method, for example, attacks the surface of the substrate 12 with a chemical solution to isotropically etch the substrate 12 surface. An isotropic etching method is used to form concave curved surfaces 19 in the substrate 12 surface. It should be further noted that the shape of these curved surfaces 19 is the inverse of the partial spherical surface that defines the shape of the lenses 32 that are finally formed in a light transmitting layer 30 (FIG. 3(C)).

After etching is completed, the resist layer 14 is removed as shown in FIG. 1(E), leaving curved surfaces 19 in the surface of substrate 12 and completing the master 10.

A master 10 thus produced according to this preferred embodiment can be reused repeatedly insofar as the durability of the master 10 material permits, and is therefore economical. The master 10 manufacturing process can also be eliminated in the second and subsequent microlens array manufacturing processes, thereby reducing the number of steps required for microlens array production and reducing microlens array production cost.

It is to be further noted that while the present embodiment has been described using a positive resist for the formation of curved surfaces 19 on substrate 12, a negative resist can be alternatively used with the same results. With a negative resist radiation renders the area exposed to radiation insoluble to the developer, and the resist area not exposed to radiation is thus selectively removed by the developer. In this case the mask 16 pattern is obviously the inverse of the positive resist mask pattern.

Yet further alternatively the mask 16 can be eliminated and a laser or electron beam used to directly expose the resist in the desired pattern.

Referring next to FIG. 2(A), the curved surfaces 19 side of master 10 is coated with a metallic film 22 to form a conductor thereon. This metallic film 22 is, for example, a nickel (Ni) film formed to a 500 to 1000 angstrom ($10^{-10}$ m) thickness. The metallic film 22 can also be formed by such methods as sputtering, CVD, vapor deposition, and electroless plating.

It should be noted that if the surface of the curved surfaces 19 of master 10 is electrically conductive, this metallic film formation process can be omitted.

Next, a thick metal layer 24 of nickel is electrodeposited by an electroforming method using this metallic film 22 as a cathode and a tip or ball of nickel as an anode. See FIG. 2(B). A typical electroplating solution is shown below.

| | |
|---|---|
| nickel sulfamate | 550 g/l |
| boric acid | 35 g/l |
| nickel chloride | 5 g/l |
| leveling agent | 20 mg/l |

Next, as shown in FIG. 2(C), the metal layer 24 and metallic film 22 are removed from the master 10 and washed as required to obtain duplicate master 20. Note that this duplicate master 20 also has curved surfaces 26 conforming to the curved surfaces 19 of the master 10. These curved surfaces 26 are the reversed pattern used for forming lenses 32 shown in FIG. 3(C) by a transfer molding process.

It is to be noted that when the master 10 is made of metal, the metallic film 22 (or the metal layer 24 if the above-noted conductor forming process is omitted) may adhere tightly to the master 10, and separation from the master 10 may be difficult. In such cases a process for improving the mold separation properties of the master 10 is preferably applied to the surface of the curved surfaces 19 before the metallic film 22 (or metal layer 24) is formed on the curved surfaces 19 of the master 10. If the master 10 is made of nickel, for example, plasma oxidation or anodizing processes are effective means of improving mold separation.

The metallic film 22 is then removed from the duplicate master 20, using a separation process as required.

A process for forming a light transmitting layer having a plurality of lenses is described next with reference to FIGS. 3(A) to (C).

First, as shown in FIG. 3(A), a light transmitting layer precursor 28 is placed on the surface of the duplicate master 20 having curved surfaces 26. A reinforcing plate 34 is then pressed to the duplicate master 20 with the light transmitting layer precursor 28 therebetween, thereby spreading the light transmitting layer precursor 28 over a specific area and forming a light transmitting layer precursor 28 layer between the duplicate master 20 and reinforcing plate 34 as shown in FIG. 3(B).

It should be noted that while the light transmitting layer precursor 28 is described above as placed on the duplicate master 20, the light transmitting layer precursor 28 can alternatively be placed on the reinforcing plate 34, or on both the duplicate master 20 and reinforcing plate 34. Yet further alternatively, the light transmitting layer precursor 28 can be coated over a specific area of the duplicate master 20 and/or the reinforcing plate 34 by such methods as spin coating, spray coating, roll coating, bar coating, and dipping.

It should be yet further noted that when the duplicate master 20 and reinforcing plate 34 are combined with the light transmitting layer precursor 28 therebetween, the light transmitting layer precursor 28 can be compressed as required with pressure applied to the duplicate master 20 or reinforcing plate 34.

The light transmitting layer precursor 28 is furthermore preferably a liquid or a liquefiable material. By using a liquid form, the light transmitting layer precursor 28 can be easily filled to the plurality of curved surfaces 26 on the duplicate master 20. Liquid materials can be materials that can be set by the application of energy; liquefiable materials are preferably plastic.

The light transmitting layer precursor 28 can furthermore be any material that is light transmitting once the light transmitting layer 30 is formed, but is preferably a resin material. Resins with good plasticity and energy-setting resins are preferred because of their ready availability.

Energy-setting resin as used herein means a resin that can be set by the application of either light or heat. By using a photosetting or thermosetting resin, widely available exposure systems, baking ovens, hot plates, and other heating devices can be used, thereby helping to reduce and minimize equipment costs.

Exemplary energy-setting resins include: acrylic resins, epoxy resins, melamine resins, and polyimide resins. Acrylic resins in particular are desirable because a wide range of commercially available precursors and photosensitizers (photopolymerization initiators) can be used, the resin can be set in a short time by exposure to light, and a light transmitting layer 30 with excellent optical characteristics can be achieved.

Specific examples of the basic constitution of a photosetting acrylic resin include prepolymers, oligomers, monomers, and photopolymerization initiators.

Exemplary prepolymers and oligomers include: acrylates such as epoxy acrylate, urethane acrylate, polyester acrylate, polyether acrylate, and spiroacetal acrylate; and methacrylates such as epoxy methacrylate, urethane methacrylate, polyester methacrylate, and polyether methacrylate.

Exemplary monomers include: monofunctional monomers such as 2-ethylhexyl acrylate, 2-ethylhexyl methacrylate, 2-hydroxyethyl acrylate, 2-hydroxyethyl methacrylate, n-vinyl-2-pyrrolidone, Carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexacrylate.

Exemplary photopolymerization initiators include: acetophenone compounds such as 2,2-dimethoxy-2-phenyl acetophenone; butyl phenone compounds such as α-hydroxy isobutyl phenone and p-isopropyl-α-hydroxy isobutyl phenone; halogenated acetophenone compounds such as p-tert-butyl dichloro acetophenone, p-tert-butyl trichloro acetophenone, and α,α-dichlor-4-phenoxy acetophenone; benzophenone compounds such as benzophenone [diphenyl ketone], and n,n-tetraethyl-4,4-diamino benzophenone; benzyl compounds such as benzyl, and benzyldimethyl ketal;

benzoin compounds such as benzoin and benzoinalkylether; oxime compounds such as 1-phenyl-1,2-propanedione-2-(o-ethoxycarbonyl) oxime; xanthone compounds such as 2-methylthio xanthone, and 2-chlorothio xanthone; benzoin ether compounds such as benzoin ether and isobutyl benzoin ether; and radical forming compounds such as Michler's ketone and benzyl methyl ketal.

Various additives can also be added as required. For example, amines or other compounds can be added to prevent oxygen from inhibiting resin setting, and solvents can be added to improve coating properties. The solvents that can be used include but are not limited to such organic solvents as: propylene glycol monomethylether acetate, methoxymethyl propionate, ethoxyethyl propionate, ethyl lactate, ethyl pyruvate, and methyl amyl ketone.

An energy-setting resin as described above is disposed between the duplicate master 20 and reinforcing plate 34 by a method such as described above as shown in FIG. 3(B), and the resin is then set by means of an appropriate setting process. For example, if a photosetting resin is used, the resin is set by exposure to light under appropriate conditions to form the light transmitting layer 30.

It will be obvious that if the light transmitting layer 30 is formed using a photosetting resin, at least one of the duplicate master 20 and reinforcing plate 34 members must also be transparent to the light used for photosetting.

Exemplary plastic resins include such thermoplastic resins as polycarbonate resin, polymethyl methacrylate resin, and amorphous polyolefin resin. Such resins can be plasticized to liquid form by heating to above the softening point, then disposed between the duplicate master 20 and reinforcing plate 34 as shown in FIG. 3(B). The softened resin is then cooled to harden and thus form the light transmitting layer 30.

By thus using as the light transmitting layer precursor 28 a material that can be plasticized or set by applying appropriate energy, the light transmitting layer precursor 28 can be reliably filled completely throughout the curved surfaces 26 formed in the duplicate master 20 when the light transmitting layer precursor 28 is coated and pressed to the duplicate master 20. By then setting the light transmitting layer precursor 28 using a setting process appropriate to the precursor material to form the light transmitting layer 30, the curved surfaces 26 in the duplicate master 20 can be precisely transferred to the light transmitting layer 30.

The material from which the reinforcing plate 34 is made shall not be limited insofar as it provides the light transparency and other optical properties required by the microlens array in addition to the required mechanical strength. Exemplary materials include: quartz, glass, and such plastic and film materials as polycarbonate, polyarylate, polyether sulfone, polyethylene terephthalate, polymethyl methacrylate, and amorphous polyolefin.

It is to be further noted that if the light transmitting layer 30 alone can provide the mechanical strength required for the microlens array, the reinforcing plate 34 can be omitted.

After the light transmitting layer 30 is thus formed on the duplicate master 20, the light transmitting layer 30 and reinforcing plate 34 are removed together from the duplicate master 20. The light transmitting layer 30 thus has the plurality of lenses 32 transferred from the curved surfaces 26 in the form of microlens array 1. Note that the lenses in this embodiment of the invention are concave.

In summary, this preferred embodiment of the invention is a method for duplicating duplicate master 20 from a master 10 having curved surfaces 19, and then using this duplicate master 20 to form each microlens array product having a plurality of lenses 32. The master 10 is therefore used only to manufacture the duplicate master 20, thus reducing master 10 deterioration and the frequency with which the master 10 must be manufactured. As a result, microlens array production cost can be reduced.

Embodiment 2

A manufacturing method according to a second preferred embodiment of the present invention is described below with reference to FIG. 4(A) to FIG. 6(C). FIGS. 4(A) to (C) are section views illustrating steps in the manufacture of an intermediate master according to this second embodiment of the present invention.

A master 10 as prepared and used in the first embodiment above is also used in this second embodiment. As shown in FIG. 4(A), an intermediate master precursor 42 is placed on the master 10 over the curved surfaces 19 formed therein. A reinforcing plate 40 is then pressed to the master 10 with the intermediate master precursor 42 therebetween, thereby spreading the intermediate master precursor 42 over a specific area and forming an intermediate master precursor 42 layer between the master 10 and reinforcing plate 40 as shown in FIG. 4(B).

It should be noted that while the intermediate master precursor 42 is described above as placed on the master 10, it can alternatively be placed on the reinforcing plate 40, or on both the master 10 and reinforcing plate 40. Yet further alternatively, the intermediate master precursor 42 can be coated over a specific area of the master 10 and/or the reinforcing plate 40 by such methods as spin coating, spray coating, roll coating, bar coating, and dipping.

The reinforcing plate 40 is for strengthening the intermediate master 44, and the material used therefor shall not be limited insofar as it provides sufficient process durability in the process for manufacturing the intermediate master 44 and the process for manufacturing a duplicate master 50 from the intermediate master 44. Exemplary materials include: quartz, glass, resin, metal, and ceramic. The reinforcing plate 40 can also be omitted if the intermediate master 44 alone provides sufficient process durability.

The intermediate master precursor 42 shall also not be limited to a particular material insofar as it provides good mold release properties enabling easy separation from the master 10 and accurately transfers curved surfaces 19, provides sufficient process durability in the subsequent processes manufacturing a duplicate master 50 (see FIG. 5(C)) from the intermediate master 44 (see FIG. 4(C)), and enables accurate transfer of curved surfaces 46 from intermediate master 44 to the duplicate master 50. The intermediate master precursor 42 can therefore be made from, for example, the materials used for the light transmitting layer precursor 28 in the first embodiment above. These materials are preferable because they provide good mold release properties when used with silicon or quartz, which are excellent materials for the master because they can be etched with high precision.

The curved surfaces 19 in the master 10 are transferred to the intermediate master precursor 42 by pressing the reinforcing plate 40 and master 10 together with the intermediate master precursor 42 disposed therebetween. It will be obvious that when the master 10 and reinforcing plate 40 are combined, pressure can be applied to either member. Applying pressure reduces the time required for the intermediate master precursor 42 to conform to the curved surfaces 19 in the master 10, and thus improves productivity and assures distribution of the intermediate master precursor 42 to the curved surfaces 19.

The intermediate master precursor 42 is then set by means of an appropriate setting process to form an intermediate master 44 as shown in FIG. 4(B).

The intermediate master 44 and reinforcing plate 40 are then separated from the master 10 as shown in FIG. 4(C). The intermediate master 44 thus obtained has convex curved surfaces 46 corresponding to the concave curved surfaces 19 in the master 10.

FIGS. 5(A) to (C) illustrate the process for manufacturing a duplicate master from this intermediate master 44. As shown in FIG. 5(A), a metallic film 52 is formed on the curved surfaces 46 of the intermediate master 44, a metal layer 54 is then formed on the metallic film 52 as shown in FIG. 5(B), and the metallic film 52 and metal layer 54 are then removed from the intermediate master 44 as shown in FIG. 5(C) to obtain a duplicate master 50.

It is to be noted that this process is substantially identical to that shown in FIGS. 2(A) to (C), and further description thereof is thus omitted below. It should be further noted that the intermediate master 44 can be reused in this process insofar as the durability thereof enables.

A process for forming a light transmitting layer having a plurality of lenses is described next with reference to FIGS. 6(A) to (C).

As shown in FIGS. 6(A) and (B), the duplicate master 50 and reinforcing plate 64 are placed together with a light transmitting layer precursor 58 disposed therebetween. This process is substantially identical to that shown in FIGS. 3(A) to (B), and the light transmitting layer precursor 58 can also be made from the same material used for the light transmitting layer precursor 28 shown in FIG. 3(A). The reinforcing plate 64 can also be made from the same materials used for the reinforcing plate 34 shown in FIG. 3(A), and can be similarly omitted if the light transmitting layer 60 alone provides sufficient mechanical strength and other properties required for the microlens array.

The light transmitting layer precursor 58 disposed between the duplicate master 50 and reinforcing plate 64 as shown in FIG. 6(B) is then set by means of an appropriate setting process to form a light transmitting layer 60. This process is also substantially identical to that shown in FIG. 3(B).

The light transmitting layer 60 and reinforcing plate 64 are then together removed from the duplicate master 50 as shown in FIG. 6(C). The light transmitting layer 60 thus has the plurality of lenses 62 transferred from the curved surfaces 56 in the form of microlens array 2. Note that the lenses 62 in this embodiment of the invention are convex.

In addition to the benefits of the first embodiment described above, an intermediate master 44 is used to manufacture a duplicate master 50. A wider range of materials can therefore be used for the master 10 and duplicate master 50 because the duplicate master 50 is not directly separated from the master 10. The curved surfaces 46 and 56 can also be transferred with high precision, and there is greater freedom in the methods that can be used to manufacture the duplicate master 50. It is also possible to further improve the durability of the master 10 and duplicate master 50.

Embodiment 3

A manufacturing method according to a third preferred embodiment of the present invention is described below with reference to FIG. 7(A) to FIG. 8(C). While a master 10 having concave curved surfaces 19 is used in the above described first and second embodiments, the method according to this third embodiment produces a master with convex curved surfaces.

As shown in FIG. 7(A), a resist layer 114 is formed on a substrate 112. This process and the materials used for the substrate 112 and resist layer 114 are the same as in the first embodiment above (see FIG. 1(A)), and further description thereof is omitted below.

A mask 116 is then placed over the resist layer 114 as shown in FIG. 7(B), and the resist layer 114 is then exposed to radiation 118 through this mask 116. Note that the mask 116 is patterned to block radiation 118 only to those parts of the resist layer 114 where the curved members 119 are to be formed (FIG. 7(C)).

After exposing the resist layer 114 to radiation 118, the resist layer 114 is processed under specific developing conditions to selectively remove the radiation-bombarded regions 117. This developing step exposes the substrate 112 in the radiation-bombarded areas, and leaves the substrate 112 covered by the resist layer 114 where the resist layer 114 was not exposed to radiation 118 (FIG. 7(C)).

After thus patterning the resist layer 114, the resist layer 114 is heated in a reflow process to melt the resist layer 114. When the resist layer 114 thus melts, the surface tension of the resist causes the surface of the resist layer 114 to rise, forming convexly curved parts as shown in FIG. 7(D).

Using this resist layer 114 as a mask, the substrate 112 is then etched by an etchant to a specific depth as shown in FIG. 7(D). More specifically, the substrate 112 is anisotropically etched using, for example, a dry etching process such as reactive ion etching.

This etching process is illustrated in FIGS. 8(A) to (C). The surface of the substrate 112 is covered in part by convexly curved resist layer 114 as shown in FIG. 7(D). When anisotropic etching begins, the surface of the substrate 112 not covered by the resist layer 114 is etched first. The resist layer 114 is then etched by the etchant 120 and gradually recedes from the area indicated by the double-dot dash line to the area indicated by the solid line as shown in FIGS. 8(A) and (B). It should be noted that because the resist layer 114 has a convex curved shape, the substrate 112 is gradually exposed as the area covered by the resist layer 114 decreases, and etching the substrate 112 continues from the exposed area of the substrate 112. The surface profile of the etched substrate 112 thus assumes a curved shape because substrate etching advances as the resist layer 114 recedes. When etching is stopped, master 110 is obtained with convex curved surfaces 119 formed on the substrate 112 as shown in FIG. 8(C).

This master 110 can also be reused numerous times insofar as its durability enables, and is therefore economical. Manufacturing this master 110 can also be omitted from the manufacturing process for the second and subsequent microlens arrays, thereby reducing the number of process steps and reducing microlens array production cost.

FIG. 9 shows an electronic device and the function thereof using a microlens array obtained from a manufacturing method according to the present invention. More specifically, FIG. 9 shows a display device, and even more specifically a projection type display device, that is, an LCD projector. This LCD projector uses a lamp 202 as a light source, and a light valve 201 comprising a microlens array 2 manufactured with a method according to the above second embodiment of the invention.

The microlens array 2 is disposed with the lenses 62 directed away from the lamp 202. A protective film 203 is formed over the lenses 62, and a black matrix 204 is disposed over the protective film 203. A transparent common electrode 205 and orientation film 206 are further layered over the black matrix 204. Note that the refractive index of the material used for the protective film 203 is less than the refractive index of the light transmitting layer forming the microlens array 2.

A TFT layer 211 is further disposed in the light valve 201 with a gap between it and the orientation film 206. The TFT layer 211 comprises a plurality of transparent individual electrodes 209 and thin-film transistors 210 covered by an orientation film 208. The TFT layer 211 is placed with orientation film 208 towards orientation film 206.

The gap between orientation films 206 and 208 is filled with liquid crystals 207. The liquid crystals 207 are driven by a voltage controlled by thin-film transistors 210.

In an LCD projector thus comprised, light 212 emitted from lamp 202 is focused by lenses 62 on individual pixels, and can therefore provide a bright image display.

It should be noted that a device using a microlens array manufactured by a method according to the present invention has been shown in FIG. 9 and described by way of example as a LCD projection display. The invention shall not be so limited, however, and a microlens array manufactured by a method according to the present invention can be used in various other ways while not departing from the intent of the present invention. For example, a further projection display device can be obtained by applying a microlens array manufactured with a method according to the present invention in a micromirror device used in conjunction with a light source. Other applications for a microlens array manufactured with a method according to the present invention include but shall not be limited to watches, compact electronics such as Personal Digital Assistant (PDA) devices, portable telephones, GPS products for automotive applications, televisions, and personal computers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A microlens array manufacturing method comprising:
    a first step for forming a master comprised of silicon or quartz including forming a plurality of first curved surfaces in the master;
    a second step for forming an intermediate master having a plurality of second curved surfaces based on the plurality of first curved surfaces;
    a third step for forming a duplicate master having a plurality of third curved surfaces based on the plurality of second curved surfaces; and
    a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins.

2. The microlens array manufacturing method as set forth in claim 1, wherein the second step for forming an intermediate master comprises:
    a step for coating an intermediate master precursor on a side of the master where the plurality of first curved surfaces are located;
    a step for setting the intermediate master precursor to form the intermediate master; and
    a step for separating the intermediate master from the master.

3. The microlens array manufacturing method as set forth in claim 2, wherein the intermediate master precursor comprises a material that can be set by applying energy thereto.

4. The microlens array manufacturing method as set forth in claim 3, wherein the applied energy is at least one of light or heat.

5. The microlens array manufacturing method as set forth in claim 2, wherein the intermediate master precursor comprises a thermoplastic material.

6. The microlens array manufacturing method as set forth in claim 1, wherein the intermediate master is made from a resin material.

7. The microlens array manufacturing method as set forth in claim 1, wherein the duplicate master is obtained by forming a metal layer by an electroforming process on a side of the intermediate master where the plurality of second curved surfaces are located, and then separating the metal layer from the intermediate master.

8. The microlens array manufacturing method as set forth in claim 1, wherein the step for forming a light transmitting layer comprises:
    a step for coating a light transmitting layer precursor on a side of the duplicate master where the plurality of third curved surfaces are located;
    a step for setting the light transmitting layer precursor to form a light transmitting layer; and
    a step for separating the light transmitting layer from the duplicate master.

9. The microlens array manufacturing method as set forth in claim 8, wherein the light transmitting layer precursor comprises a material that can be set by applying energy thereto.

10. The microlens array manufacturing method as set forth in claim 9, wherein the applied energy is at least one of light or heat.

11. The microlens array manufacturing method as set forth in claim 8, wherein the light transmitting layer precursor comprises a thermoplastic material.

12. The microlens array manufacturing method as set forth in claim 1, wherein the light transmitting layer is made from a resin material.

13. The microlens array manufacturing method as set forth in claim 1, wherein the first curved surfaces of the master are formed by lithographic and etching processes.

14. A method for manufacturing an electronic device equipped with a display device, comprising the steps of:
    forming a microlens array by a process comprising:
        a first step for forming a master comprised of silicon or quartz including forming a plurality of first curved surfaces in the master,
        a second step for forming an intermediate master having a plurality of second curved surfaces based on the plurality of first curved surfaces,
        a third step for forming a duplicate master having a plurality of third curved surfaces based on the plurality of second curved surfaces, and
        a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins; and
    forming the display device by using a liquid crystal panel and the microlens array.

15. A method for manufacturing an electronic device equipped with a display device, comprising the steps of:
    forming a microlens array by a process comprising:
        a first step for forming a master comprised of silicon or quartz including forming a plurality of first curved surfaces in the master, a second step for forming an intermediate master having a plurality of second curved surfaces based on the plurality of first curved surfaces, a third step for forming a duplicate master having a plurality of third curved surfaces based on the plurality of second curved surfaces, and a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins; and forming the display device by using a TFT layer and the microlens array.

16. A method for manufacturing an electronic device equipped with a display device, comprising the steps of:

forming a microlens array by a process comprising:

a first step for forming a master comprised of silicon or quartz including forming a plurality of first curved surfaces in the master, a second step for forming an intermediate master having a plurality of second curved surfaces based on the plurality of first curved surfaces, a third step for forming a duplicate master having a plurality of third curved surfaces based on the plurality of second curved surfaces, and a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins; and forming the display device by using a micromirror device and the microlens array.

17. A method for manufacturing a projection display, comprising the steps of:

forming a microlens array by a process comprising:

a first step for forming a master comprised of silicon or quartz including forming a plurality of first curved surfaces in the master, a second step for forming an intermediate master having a plurality of second curved surfaces based on the plurality of first curved surfaces, a third step for forming a duplicate master having a plurality of third curved surfaces based on the plurality of second curved surfaces, and a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins; and forming the display by using a micromirror device and the microlens array.

18. A method for manufacturing a projection display, comprising the steps of:

forming a microlens array by a process comprising:

a first step for forming a master comprised of silicon or quartz including forming a plurality of first curved surfaces in the master, a second step for forming an intermediate master having a plurality of second curved surfaces based on the plurality of first curved surfaces, a third step for forming a duplicate master having a plurality of third curved surfaces based on the plurality of second curved surfaces, and a fourth step for forming a light transmitting layer having a plurality of lenses based on the plurality of third curved surfaces, wherein the light transmitting layer is formed of at least one resin material selected from the group consisting of acrylic resins, epoxy resins, melamine resins and polyimide resins; and forming the display by using a liquid crystal light valve and the microlens array.

* * * * *